United States Patent

[11] 3,556,270

| [72] | Inventor | Paul Comment<br>2892 Courgenay, Switzerland |
|---|---|---|
| [21] | Appl. No. | 835,208 |
| [22] | Filed | June 20, 1969<br>Continuation-in-part of application Ser. No. 691,802, Dec. 19, 1967, now abandoned. |
| [45] | Patented | Jan. 19, 1971 |
| [32] | Priority | Dec. 22, 1966 |
| [33] | | Switzerland |
| [31] | | 18356/66 |

[54] MANUAL CONTROL FOR ACCELERATOR
15 Claims, 5 Drawing Figs.

[52] U.S. Cl................................................ 192/3,
74/531
[51] Int. Cl...................................................F16d 23/00,
G05g 5/06
[50] Field of Search........................................ 317/135;
307/10; 192/3T; 74/531

[56] References Cited
UNITED STATES PATENTS
2,868,035  1/1959  Mudon.......................... 74/513

| 2,890,596 | 6/1959 | Hatchett...................... | 74/531 |
| 2,911,077 | 11/1959 | Carter Jr. .................... | 192/3 |
| 3,226,674 | 12/1965 | Criksson...................... | 340/53 |
| 3,331,478 | 7/1967 | Trifiletti et al................ | 192/3 |
| 3,371,736 | 3/1968 | Lewis et al.................... | 180/82 |

*Primary Examiner*—M. Cary Nelson
*Assistant Examiner*—Wesley S. Ratliff, Jr.
*Attorneys*—Robert E. Burns and Emmanuel J. Lobato ABSTRACT: In a manual control system for the throttle of a vehicle engine, a control member connected with the throttle is spring biased to a rest position and is movable to selected operative positions by means of a handle which is located convenient to the operator. An electromagnetic brake for holding the control member in set position is controlled by switches connected in series and including a manual switch on the handle, a switch controlled by the position of the control member, a switch controlled by the vehicle brake, and a switch controlled by the vehicle clutch.

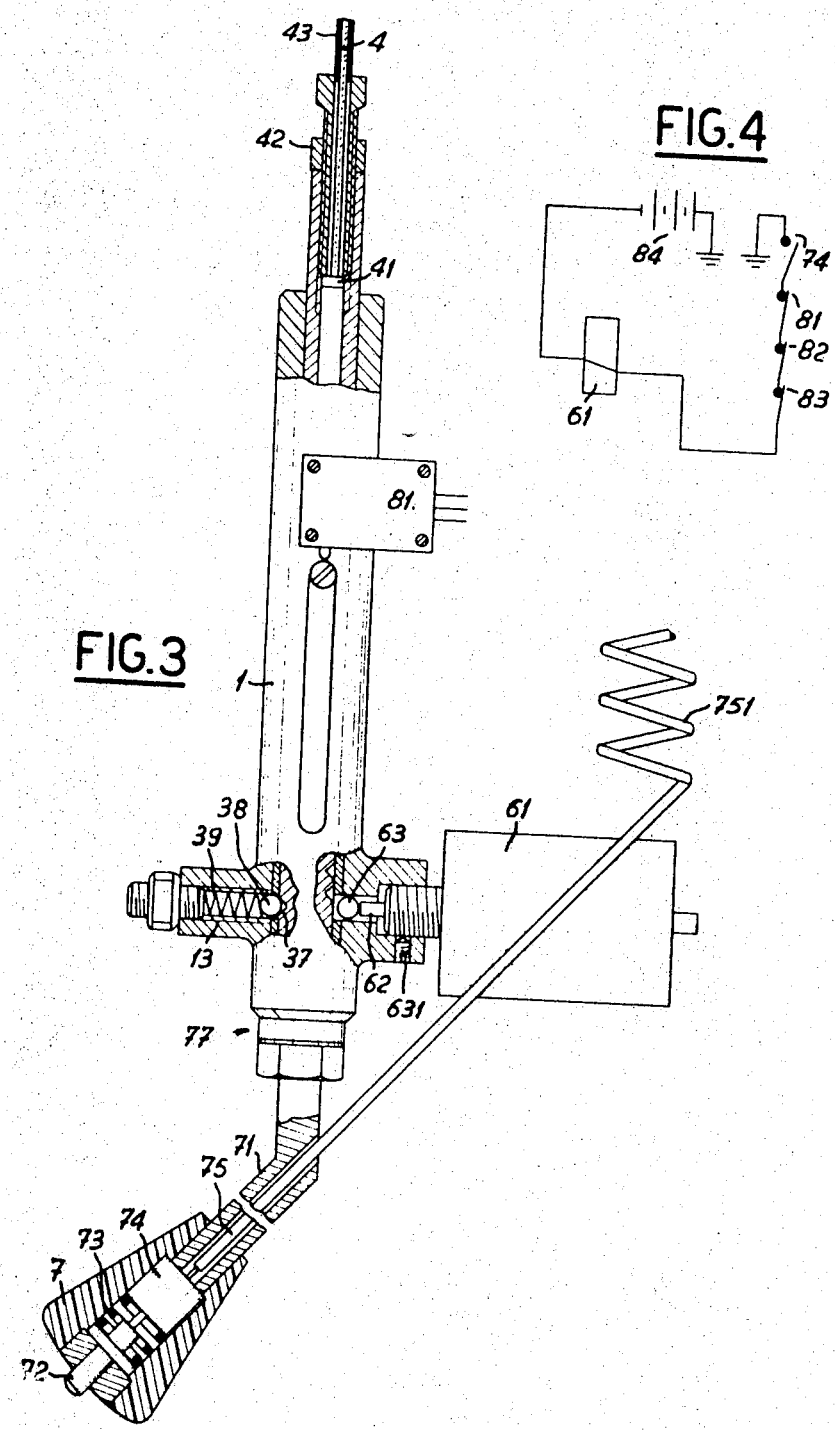

3,556,270

MANUAL CONTROL FOR ACCELERATOR

This is a continuation-in-part of my application Ser. No. 691,802, filed Dec. 19, 1967, now abandoned.

The use of an automobile vehicle over long distances on fast roads and in particular along highways makes it more and more desirable for the driver to have manual control means for the accelerator which permit him to maintain the power developed by the engine at a certain value and render it unnecessary for him to keep his foot constantly on the accelerator pedal.

Already known are various manual control devices for automobile accelerators comprising a control member movable against a return spring connected to the gas inlet member and a device for blocking this mobile element in the desired position, generally an electromagnet. The various known solutions have certain drawbacks. In effect, the movable member is often made in the shape of a rod or a piston sliding inside a cylinder, the blocking being ensured by a pressure member, generally an electromagnet, pressing an intermediate element, generally a ball, in suitable hollows made on the body of the piston. This device makes possible then only a limited number of intermediate positions equal to the number of hollows provided for the ball. If the ball is replaced by a brake shoe lining, an adjustment to an intermediary position is equally difficult owing to the small distance available between the two extreme gas-adjusting positions.

Additionally, known devices do not give a practical way of adjusting the pressure exerted by the blocking element against the movable element, in particular in proportion to the variable resistance offered by the return spring of the carburetor's throttle valve and in proportion with the wear of the braking element.

Finally the blocking force obtained by the electromagnetic lock must be adjusted in order to ensure a foolproof immobility of the movable member even when it is drawn to a position corresponding to the maximal gas opening, that is in the position where the the return spring of the throttle valve of the carburetor is maximal. Under these conditions the stress to be exerted on the holding member of the movable element can be rather high since in all the intermediate positions the blocking effort of the electromagnetic lock adjusted in proportion to the maximum opening position must be overcome.

The present invention has for its object a manual control device for the accelerator of an automobile motor comprising a control member movable against a return spring connected to the gas-admitting member, an electromagnet whose movable element is able to press at least indirectly against said movable member when the electromagnet is fed with current, this electromagnet being placed in a circuit comprising at least two contacts, one controlled by said movable member and having for its purpose to avoid these drawbacks.

This device is characterized by the fact that it comprises at least two coaxial discs, one angularly fixed, the other rotatably mounted, cooperating with said positioning means and connected to said control member, with axially movable means connecting said electromagnet to one of the discs in such a way that the electromagnet can cause the axial movement of these discs relatively one against the other; by the fact that it comprises adjusting means of the race of the movable element of the electromagnet; and by the fact that the other contact is provided in the grasping member of said movable member, this grasping member being connected at least indirectly to said movable member.

The accompanying drawing represents by way of example various modifications of the present invention.

FIG. 3 is a partial cross-sectional view of another modification.

FIG. 4 is a circuit diagram of the device.

Figure 1:
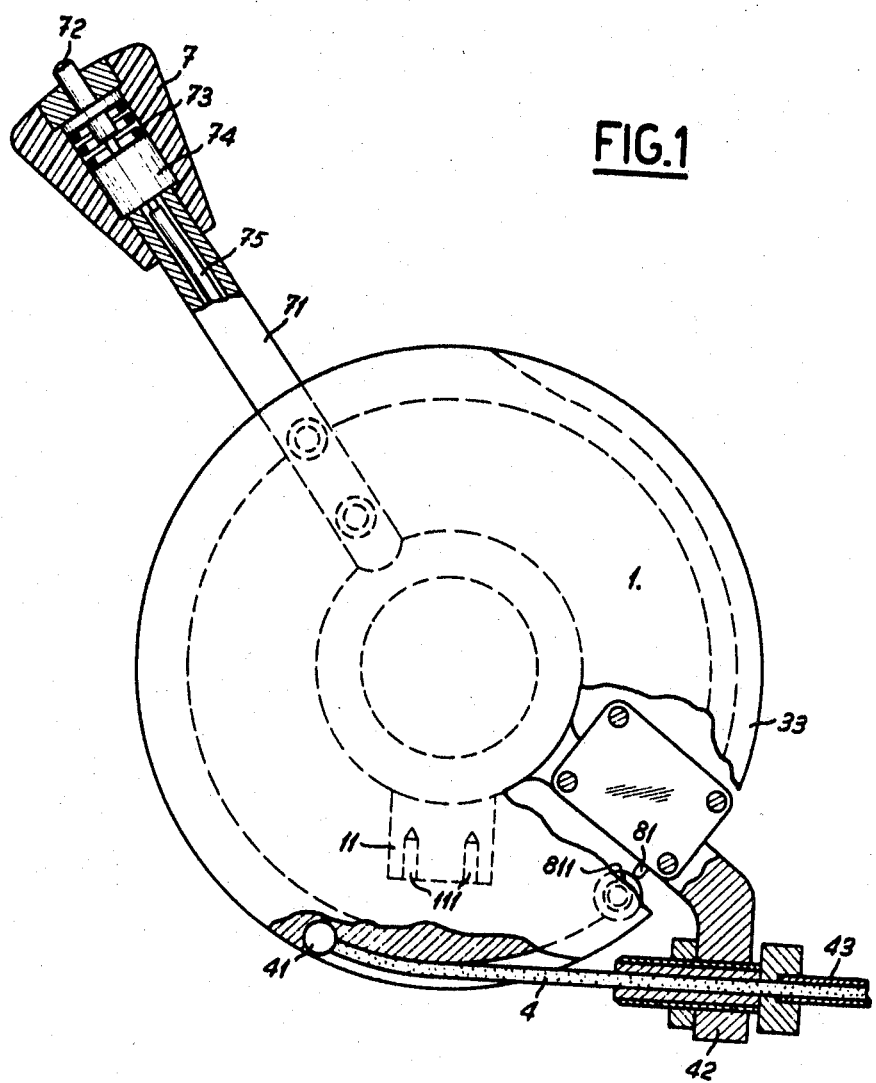
FIG. 1 is a partial cross-sectional view of one modification of the device according to the invention, this view being pr perpendicular to the rotational axis of the movable member.
Figure 2:
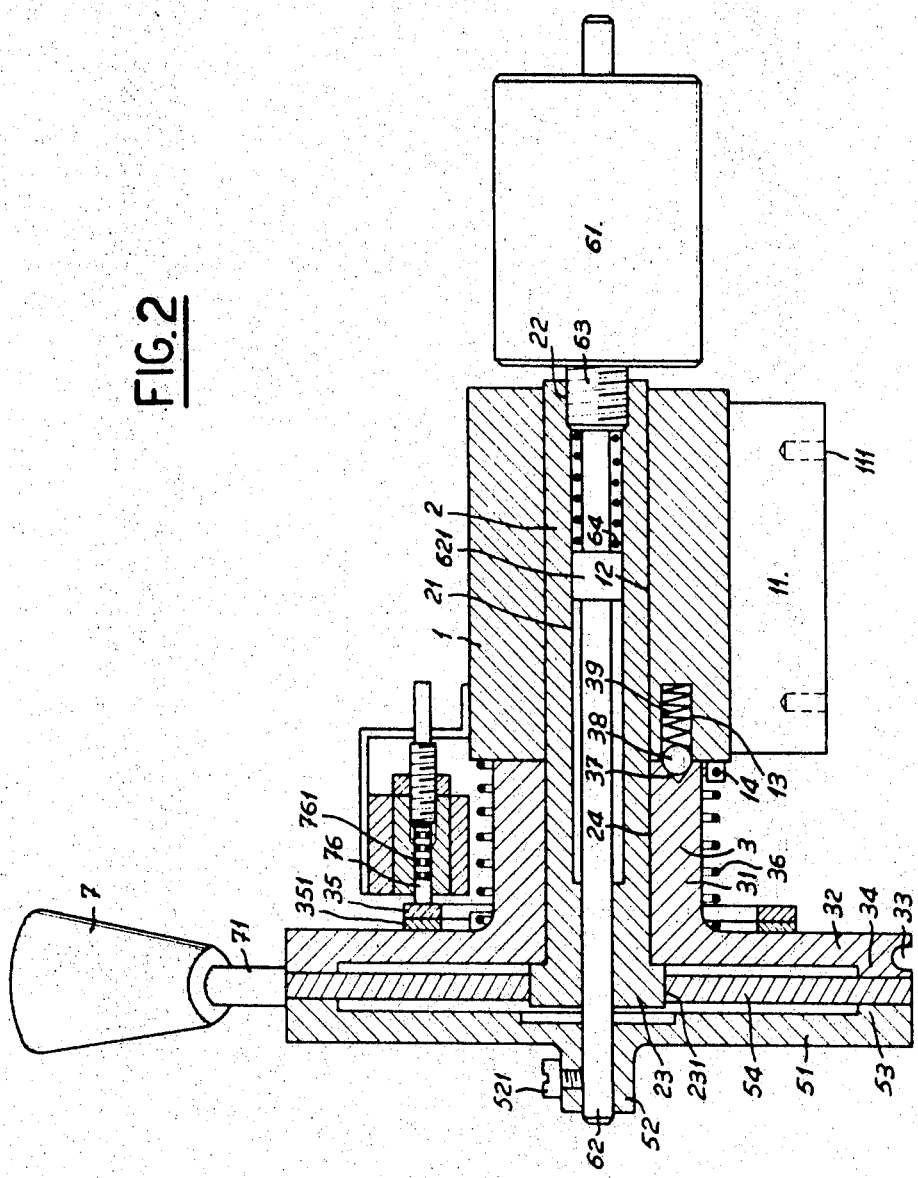
FIG. 2 is a cross-sectional view of the same device parallel to the main axis.

In FIGS. 1 and 2, the device shown comprises a cylindrical body 1 which is secured for example by means of clamping rings around the steering column, on the transmission shaft, or above the gear box, if there is one. For this purpose, body 1 has a part 11 which projects radially from cylindrical body 1 and has four threaded holes 111, for securing screws which are not shown. Cylindrical body 1 is perforated in its center by a cylindrical bore 12 in which is secured a tubular piece 2. This tubular piece 2, also perforated by a cylindrical hole 21 is tapped at one end 22 and terminates at the other extremity by an enlarged section 23, comprising an outer annular shoulder 231.

The cylindrical part 24 of tube 2, not hidden by body 1, serves as a support for the control member proper 3. The latter is constituted by a cylindrical sleeve 31 and an enlarged cylindrical flange portion 32. It is maintained axially on tube 2 on one side by the adjacent end of cylindrical body 1 and on the other side by the inner shoulder of enlarged section 23. The flange portion 32 has on its periphery a groove 33 intended for winding the cable 4 connecting the movable member to the throttle of the carburetor and an axially projecting rim 34 making possible its braking. A concentric conductive ring 35 is mounted on control member 3 from which it is however spaced by an insulating ring 351. A helical torsion spring 36 is provided around cylindrical sleeve 31, its angular locking being ensured on the one hand against a stop 14 of body 1, and on the other hand by a corresponding stop on flange portion 32, not shown here.

In the example shown here, the inoperative position of the apparatus is defined by a stop device, comprising a ball 38, which lodges in a conical tapping 37 provided on the edge of sleeve 31 under the urging of a spring 39 itself housed in a corresponding opening 13 of cylindrical body 1. This device prevents involuntary movement of movable member 3 when the throttle of the carburetor is actuated by the pedal, it being supposed that the rigidity of the linking cable is sufficient to ensure this movement.

In FIG. 1 the attachment of the connected cable to the movable member can readily be seen. To simplify matters these details have not been shown in FIG. 2. Cable 4 is attached to the periphery of movable member 3, through a stop 41. During operation, it winds more or less in groove 33 provided for this purpose on the periphery of movable member 3. Device 42 on the details of which it is not necessary to elaborate, serves on the one hand to ensure the fastening of sheath 43 guiding cable 4 to the carburetor and on the other hand to make possible the initial adjustment of the cables tension.

Braking of the movable member 3 is ensured by means of a disc 51 comprising at its center a hub 52, through which is tapped a screw 521 ensuring its positioning on a rod 62. Disc 51 is provided on its periphery with an axially projecting rim 53 corresponding to rim 34 of movable member 3. A braking disc 54 secured on shoulder 231 of the tube 2 is sandwiched between rims 53 and 34.

The device providing a braking force comprises electromagnet 61 acting on disc 51 through rod 62. The latter slides in hole 21 of tube 2 and comprises a sleeve 621 fixed on the rod. Electromagnet 61 is secured in the tapped hole 22 to tube 2, through its threaded sleeve 63, a headless screw, not shown here, ensuring its locking by radial pressure against the threaded sleeve 63. A helical compression spring 64 housed in the annular space comprised between hole 21 and rod 62 and bearing at its ends against sleeve 621 of rod 62 and threaded sleeve 63 of the electromagnet respectively, ensures, when the electromagnet is not energized, the withdrawal of disc 51 relative to disc 32 in order to avoid all braking force.

A handle member 7, shown in detail in FIG. 1, is connected to the movable member 3 through a rod 71. It comprises a control button 72 acting against spring 73. This control button acts on a first contact 74 of the electric circuit of the electromagnet. This contact 74 is connected electrically on the one hand to ground and on the other hand to the rest of the electrical circuit through insulated electric wire 75. This wire is connected to conductive ring 35 integral in rotation with movable member 3. The electrical circuit continues through sliding contact 76, for example of graphite, pressed against conductive ring 35 by spring 761 and a lead 75a connected into the rest of the circuit.

FIG. 1 shows also a second contact 81 of the electrical circuit of the electromagnet. This contact, cooperating with a stop 811 provided on the periphery of the movable organ 3, has for its purpose to cut off current to the electromagnet when the device is in inoperative position, that is in the position thereof corresponding to minimum gas. It thus avoids needlessly maintaining under tension the electromagnet when the device is not in use.

The electrical circuit is shown in it's totality but schematically in FIG. 4. The electromagnet assuring the braking force is represented at 61, while the current source, for example the automobile battery, is represented at 84. In the example shown, the electrical circuit comprises four switches in series, the first 74 being housed in the handling member 7, the second 81 being secured on the side of disc 32 of movable control member 3. The last two 82 and 83 are placed on the brake and clutch pedals in order to open the circuit of the electromagnet 61 as soon as either of these pedals is touched.

The operation of the device thus described is then the following: in inoperative position, movable member 3 is not braked, since the electrical circuit of the electromagnet is cut off thanks to stop 811 acting on contact 81. But as soon as the movable member 3 moves away from its inoperative position, contact 81 closes. To avoid braking action that would prevent an easy movement of member 3, the driver, grasping the handle member 7, presses simultaneously on button 72 thus opening contact 74 and preventing braking taking place while he moves the movable organ 3 by means of handle member 7 to the desired position. Once this position has been reached, by simultaneously letting go of the handle member 7 and button 72, the driver ensures braking at this position the control member 3. Due to the presence of this contact 74, braking of movable member 3 can be adjusted so as to be strong enough to resist the return force of spring 36 and of the carburetor throttle spring for any position, without thereby interfering with the easy movement of the handle member, since the braking force can be eliminated by simple pressure on button 72. When the driver lets go button 72 and thereby closes the feed circuit of the electromagnet, the core of this electromagnet pulls rod 62 and disc 51 to the right, which thus presses the corresponding part of the intermediate disc 54 against heel 34 of the movable disc 32. However, as soon as the driver is induced for one reason or another to touch the clutch pedal or the brake pedal, contacts 82 and 83 provided on these pedals interrupt the braking force and control member 3 is immediately brought back to its inoperative position under the combined action of spring 36 and of the AC carburetor throttle spring.

The movement of the movable element of the electromagnet can be adjusted by threaded sleeve 63 screwed a variable distance in tapped hole 22 and locked by means of screw 631 to adjust the braking force obtained. In effect, the attractive force of the coil of an electromagnet on its core varies according to the length of the movement of this core inside the coil. This adjustment takes place during installation of the apparatus and can additionally be modified during use, in proportion to the possible wear of the intermediate braking disc 54.

Certain characteristic features of the present invention can naturally be adapted on other manual control devices of the accelerator of a vehicle, as will appear from the example described in FIG. 3 in which corresponding parts are designated by the same reference numerals. The same is constituted according to the present principle by a rod sliding in a cylindrical sleeve, the positioning of this rod being ensured by a ball 63, under the urging of movable element 62 and electromagnet 61 and engaging in a series of conical holes milled along a generatrix of the rod.

Except for these differences in principle, the device for adjusting the movement of the electromagnet consists of threaded sleeve 63 and of locking screw 631, handling device 7, with its elements designated by corresponding numbers, the mechanical-locking device for the inoperative position consisting of ball 38 and spring 39 and contact 81 for cutting off the feed circuit of the electromagnet in inoperative position. In this embodiment, sliding contact device 76—35 of FIG. 2 has been simplified by connecting wire 75 of lever 71 to a fixed part of the device through a helical section 751.

There can be seen in FIG. 3, a rubber disc 77 interposed between the movable organ and the seat of the frame against which it touches and acting as a noise damper. This device can also be provided in the example shown in FIGS. 1 and 2.

The electrical circuit shown in FIG. 4 remains completely valid for the example illustrated in FIG. 3.

In another modification, not shown here, but identical in it's principle to that of FIGS. 1 and 2, the handling member 7 is not directly connected to the movable element 3 but is connected by a link in the form of a sheathed cable to obtain a space saving and particularly refined modification.

In effect the assembly of the device, with the exception of the handle, can be made in much smaller sizes and mounted in the immediate vicinity of the carburetor. The connection between movable element 3 and the carburetor throttle can then be made in the form of a simple lever, and only the handle 7 will be visible inside the car in the form of a lever or of a push button to be mounted on the dash board or centrally above the gear box, on the "console."

Figure 5:
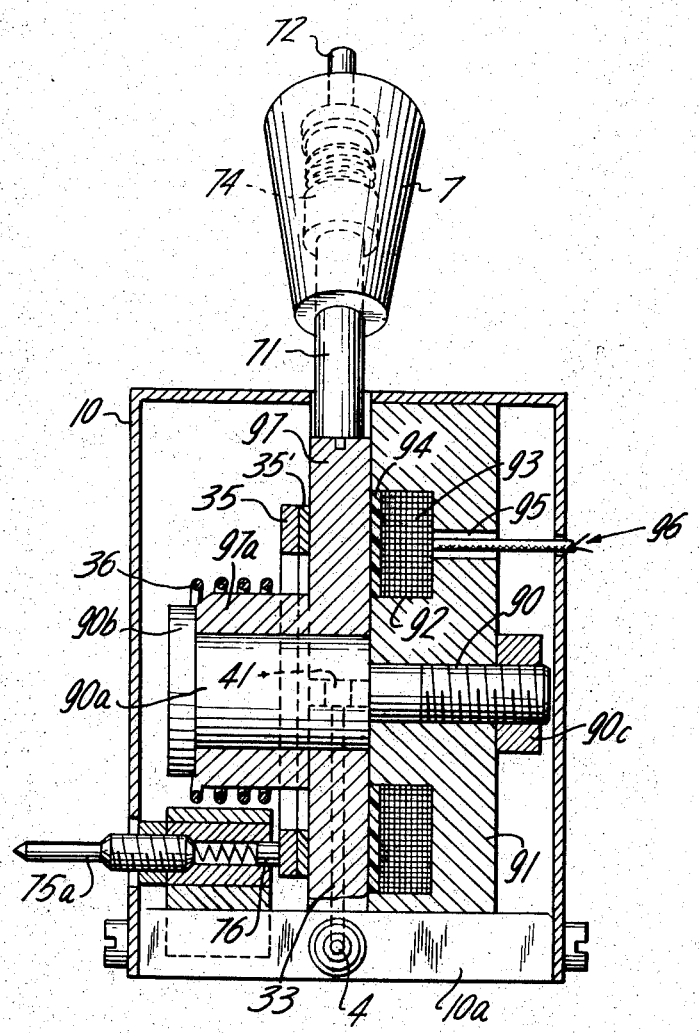
FIG. 5 is a side view partially in axial section of another embodiment of the invention.

Another embodiment of the invention which is similar to that of FIGS. 1 and 2 but of simpler and more compact construction is shown in FIG. 5 in which like parts are designated by the same reference numbers as in FIGS. 1 and 2.

A stationary magnetic armature 91 in the form of a disc made of ferromagnetic material, for example soft iron or steel, is fixed to the base plate 10a of the casing 10. The armature 91 has on its inner face an annular groove 92 containing the winding 93 of the electromagnet secured in place by an isolating ring 94 which is preferably of insulating friction material such as that used for brake shoes. Leads 96 for the magnet winding 93 extend out through a passageway 95 formed in the stationary armature 91.

The stationary armature 91 has an axle bore to receive an axle 90 for a rotatable armature 97. The axle 90 has an enlarged cylindrical portion 90a projecting beyond the inner surface of the stationary armature 91 and terminating in a annular flange portion 90b. The axle is retained in the bore of the stationary armature by a nut 90c screwed onto a projecting threaded end portion of the axle.

The rotatable armature 97 comprises a disc of ferromagnetic material and has an axially projecting sleeve portion 97a surrounding the enlarged portion 90a. The rotatable armature 97, like the rotatable member 32 in FIGS. 1 and 2, has a circumferential groove 93 to receive the carburetor control cable 4, the end of which is secured to the rotatable armature by a connection 41. A torsional spring 36 acts between the axle 90 and the rotatable armature to bias the armature toward a position corresponding to idling position of the carburetor throttle.

The armature 97 is rotatable by means of a handle 7 connected to the armature by a rod 71. As in FIGS. 1 and 2 the handle 7 is provided with a button 72 controlling a switch one contact of which is grounded while the other contact is electrically connected to a conducting ring 35 mounted concentrically on the outer face of the rotatable armature 97 and insulated therefrom by an insulating ring 35'. The conducting ring 35 is engaged by a spring pressed brush 76 connected with a lead 75a by which the switch in the handle 7 is connected in the circuit as shown in FIG. 4.

The electric circuit for the embodiment of FIG. 5 is the same as that for FIGS. 1 and 2 as shown in FIG. 4. The magnet winding 93 in FIG. 5 corresponds to the electromagnet 61 illustrated in FIG. 4. The arrangement of switches is the same as that for FIGS. 1 and 2. Thus, switch 74 is normally closed and opens only when actuated by the button 72 on handle 7. Switch 81 is not shown in FIG. 5 but corresponds to switch 81 shown in FIG. 1, being controlled by the rotatable armature 97 so as to be open when the member 97 is in its rest position (or other predetermined arbitrary position) and otherwise closed. Switches 82 and 83 are normally closed and only opened when the clutch pedal or the brake pedal respectively is actuated.

The operation of the modification shown in FIG. 5 corresponds to that described with respect to FIGS. 1 and 2. When the magnet winding 93 is energized, the magnetic flux produced by the winding pulls the rotatable armature 97 tightly against the stationary armature 91 and thereby holds the armature 97 against rotation. When the magnet winding 93 is deenergized, the rotatable armature 97 is free to turn about its axis. Thus, the rotatable armature 97 controlling the carburetor throttle through the cable 94 can be set in any desired position by means of the handle 7 while the button 72 is pressed to open switch 74 and thereby deenergized the magnet winding 93. The button 72 is thereupon released so that the magnet winding 93 is energized to hold the rotatable armature 97 in the position to which it has been set. In the event either switch 82 or 83 is opened by actuation of the clutch pedal or the brake pedal respectively, the magnet winding 93 is deenergized and the rotatable armature 97 is returned to its rest position by the spring 36 so as to close the carburetor throttle to idle position. If the usual carburetor throttle spring is sufficiently strong and the moving parts including the cable 4 are sufficiently free of friction, the spring 36 can be omitted whereupon the rotatable armature 97 will be returned to its rest position by the carburetor throttle spring when the magnet winding 93 is deenergized.

The electrical connection between the switch 74 carried by the rotatable part and the stationary portion of the electrical circuit can be realized by means of a flexible conductor such as the helical wire 751 shown in FIG. 3 instead of by the slip ring 35 and brush 76.

It will be understood that individual features of the several embodiments are mutually interchangeable insofar as they are compatible and that other modifications may be made in details of construction. Moreover, the device may be installed on motor vehicles other than automobiles.

I claim:

1. A control system for controlling the fuel control means of a combustion engine of a motor vehicle having an operator station and brake control means at said operator station, said system comprising a manually movable control member having handle means at said operator station in position for convenient hand operation by the operator of said vehicle, means connecting said control member with said fuel control means, said control member being manually movable by said handle means from a rest position in which said fuel control means is in engine idling condition to any selected operative position for desired fuel supply to the engine, means biasing said control member to said rest position, means including electromagnetic means for holding said control member in selected operative position when said electromagnetic means is energized, circuit means for energizing said electromagnetic means including in series connection a current source, said electromagnetic means and at least two switch means, a first one of said switch means being normally closed and being opened by actuation of said brake control means to deenergize said electromagnetic means and thereby free said control member for movement by said biasing means to said rest position, and a second of said switch means being normally closed and manually operable, and manual switch control means on said handle means, said switch control means being connected with said second switch means and being hand operable by the operator when operating said handle means to open said second switch to deenergize said electromagnetic means and thereby free said control member for movement by the operator to selected position.

2. A control system according to claim 1, in which said movable member comprises a rotatable disc, and said holding means comprises brake means operable by said electromagnetic means to hold said disc against rotation when said electromagnetic means is energized.

3. A control system according to claim 2, in which said brake means comprises a stationary disc coaxial with said rotatable discs, and in which said electromagnetic means is operable when energized to draw said discs together so that said stationary disc holds said rotatable disc against rotation.

4. A control system according to claim 3, in which said discs comprises ferromagnetic material, and in which said electromagnetic means comprises said discs and a magnet winding in a recess in said stationary disc, said stationary disc comprising a core of an electromagnet having said magnet winding and said rotatable disc comprising an armature of said electromagnet, said disc being thereby drawn together when said winding is energized.

5. A control system according to claim 4, in which said winding is closed in said recess by insulating friction material engageable by said rotatable disc when said winding is energized.

6. A control system according to claim 3, in which one of said discs is on a shaft extending through the other said disc, and in which said electromagnetic means comprises a solenoid connected with said shaft and operable to move said shaft axially to pull said disc together.

7. A control system according to claim 6, further comprising a friction disc between said rotatable disc and said stationary disc.

8. A control system according to claim 6, further comprising means for adjustably varying the position of said solenoid axially of said shaft to adjust the pressure between said disc when said solenoid is energized.

9. A control system according to claim 3, in which said handle means comprises a rod projecting radially of said rotatable disc and a handle on said rod.

10. A control system according to claim 9, in which said second switch means is carried by said movable control member and in which said switch control means comprises a switch operating member on said handle.

11. A control system according to claim 10, in which connections between said second switch and the rest of said circuit means comprises a slip ring insulatedly mounted concentrically on said rotatable disc and a brush engaging said slip ring.

12. A control system according to claim 1, in which said movable control member comprises a rod slidable longitudinally in a stationary sleeve and said handle means comprises a handle on one end of said rod, said second switch means being in said handle and said switch control means comprising a push button on said handle.

13. A control system according to claim 12, in which said holding means comprises a member movable transversely of said rod and engageable with said rod to hold it in selected position.

14. A control system according to claim 13, in which said electromagnetic means comprises an electromagnet operable when energized to press said transversely movable member against said rod to hold said rod in set position.

15. A control system according to claim 1, comprising a third switch which is connected in series with said first and second switches and is controlled by said movable control member to open said third switch and thereby deenergize said electromagnetic means when said control member is in said rest position.